July 30, 1974  O. A. ESSIET  3,826,795
PROCESS FOR EXTRACTING A PROTEINACEOUS SWEETENING AGENT FROM
DIOSCOREOPHYLLUM CUMMINSII BERRIES EMPLOYING HIGH SPEED
HOMOGENIZATION AND U.V. IRRADIATION
Filed July 10, 1972
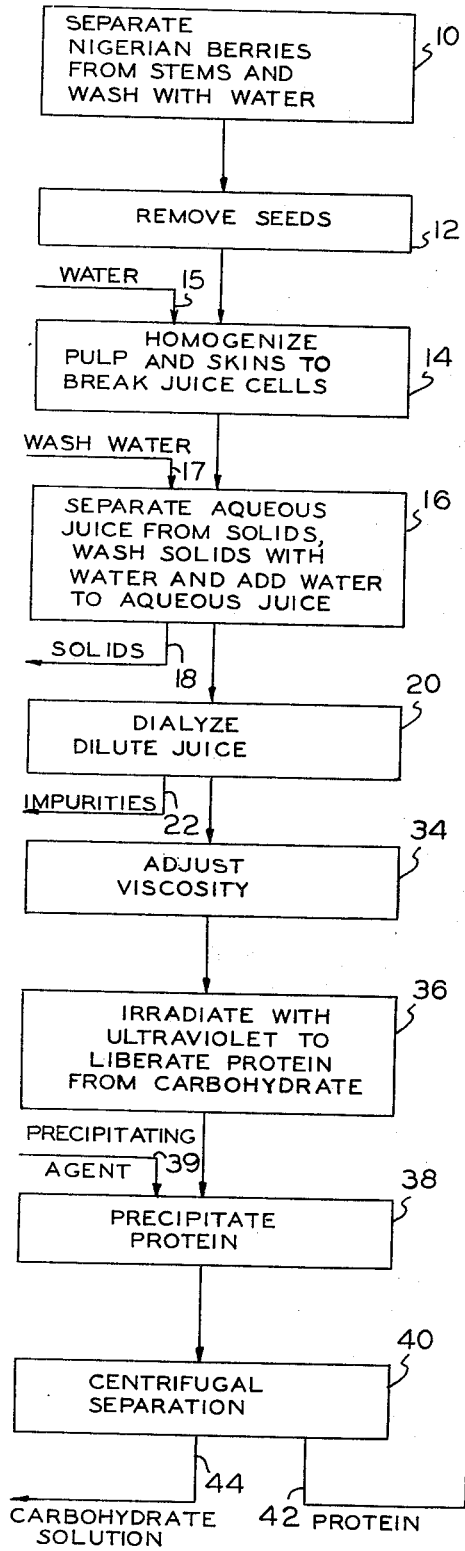
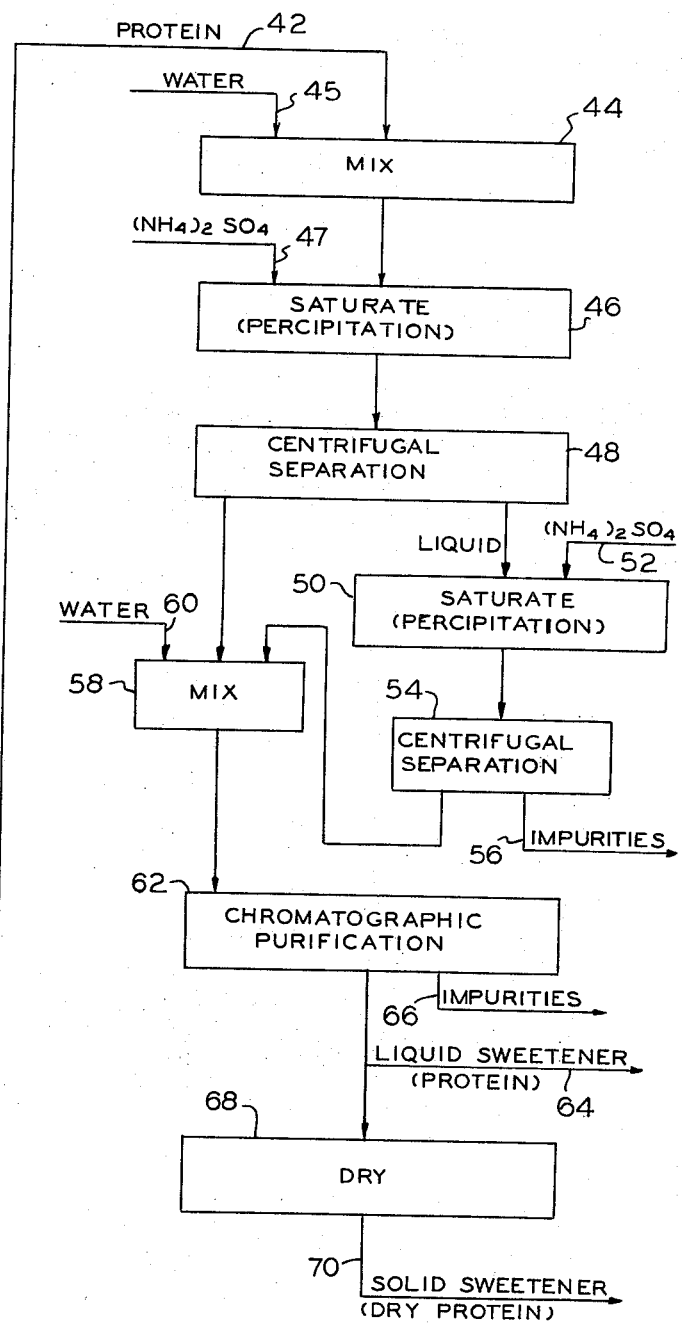

United States Patent Office

3,826,795
Patented July 30, 1974

3,826,795
PROCESS FOR EXTRACTING A PROTEINACEOUS SWEETENING AGENT FROM *DIOSCOREOPHYLLUM CUMMINSII* BERRIES EMPLOYING HIGH SPEED HOMOGENIZATION AND U.V. IRRADIATION
Okon A. Essiet, 2615 SE. 18th Ave., Portland, Oreg. 97202
Continuation-in-part of application Ser. No. 40,185, May 25, 1970, now Patent No. 3,687,693. This application July 10, 1972, Ser. No. 269,947
The portion of the term of the patent subsequent to Aug. 29, 1989, has been disclaimed
Int. Cl. A23j 1/14; A23l 1/26
U.S. Cl. 260—112 R                                              11 Claims

ABSTRACT OF THE DISCLOSURE

A valuable water soluble sweetening material which is many times sweeter than sucrose is recovered from the berries of the *Dioscoreophyllum cumminsii* vine, which is indigenous to Africa. The sweetening material material is a protein having a molecular weight of the order of 90,000 which is present as part of a carbohydrate-protein complex having a molecular weight of the order of 100,000. This complex is recovered in aqueous solution by steps including first removing the single seeds of the berries, homogenizing the remaining pulp and skin in the presence of added water and separating a diluted juice from the solid material by filtration or centrifugation or a combination of both including washing the separated solid material with water and adding the water to the separated juice. The resulting aqueous material is optionally dialyzed in cellophane bags suspended in substantially pure water to remove impurities having molecular weight below approximately 10,000. This liquid can be further treated to liberate the carbohydrate from the protein and to then precipitate and centrifugally separate the precipitated protein. The separated protein can be further purified by a series of steps involving precipitation from water solution by saturation with dry ammonium sulfate followed by chromatographic purification to produce a sweetener liquid. The sweetener liquids can have water evaporated therefrom by freeze drying to produce a crystalline water soluble powder or by heating in shallow pans to a temperature below about 55° C. under vacuum conditions to produce a dry cake which can be easily ground into a water soluble powder. The sweetener liquid can be further stabilized by adding a small amount of methylparaben to produce a liquid sweetener product, and the solid sweeteners can be further stabilized by adding a small amount of sodium chloride to produce solid sweetener product.

CROSS REFERENCE TO RELATED APPLICATION

This application is a continuation in part of my copending application Ser. No. 40,185, filed May 25, 1970 now U.S. Patent 3,687,693.

BACKGROUND OF INVENTION

Numerous substitutes for sucrose have been employed as sweetening agents, particularly in dietary food products. These sweetening agents all have certain deficiencies. For example, saccharin has an unpleasant aftertaste, sucrol is only slightly soluble in water and the salts of cyclamic acid, known as cyclamates, have been reported to be dangerous to the health of the users.

The berries of the African plant *Dioscoreophyllum cumminsii*, also called Nigerian berries in this application, contain substantial amounts of water soluble sweetening materials. A carbohydrate material which in its purified form has a sweetening effect on a dry weight basis about 1500 times as great as sucrose has been isolated on a laboratory scale as described by G. E. Inglett and Joann F. May in the Journal of Food Science, Volume 34 (1969), pages 408–411. It occurs as part of a carbohydrate-protein complex having a molecular weight of the order of 100,000. This complex has a sweetening effect of the order of 150 times that of sucrose on a dry weight basis.

The Nigerian berries grow in clusters resembling bunches of small grapes on climbing vines in the tropical forests of many portions of Africa including large areas in Nigeria. These berries are about ½ inch in diameter and have a single seed about 3/16 to ¼ inch in diameter surrounded by a white semi-solid pulp in turn surrounded by a red skin. The carbohydrate-protein complex referred to is contained primarily in the pulp and is water soluble. The carbohydrate of the complex can be liberated from the protein and it and the protein are both water soluble. So far as known, the complex referred to above has no detrimental physiological effect when ingested by humans, particularly in the amounts in which it must be used for producing an acceptable sweetening effect, and the same is true of either the separated carbohyrate or protein. These sweetening materials have no unpleasant aftertaste.

The copending application above referred to is directed to a process by which the carbohydrate sweetening agent can be recovered in purified form either in solution in water or as a solid material. The separated protein also has a sweetening effect much greater than that of sucrose but no process has heretofore been developed to recover this protein sweetening material and reduce it to marketable form.

SUMMARY

The present invention is concerned with recovering the protein sweetening material contained in Nigerian berries. This recovery is carried out in a manner which reduces the impurities contained in the resultant material to a minimum. For example, as disclosed in said copending application, it has been found that mechanical homogenization treatment of the skins and pulp in the presence of added water, after substantially all of the seeds have been removed from the berries, can be efficiently employed to break down the cells of the berry pulp and liberate substantially all of the water soluble carbohydrate-protein complex contained in such cells to the extent that simple filtration or centrifugal separation operations can be used to obtain high yields of the complex in aqueous solution without prior treatment of the mechanically homogenized material with enzymes or other extraneous materials. The sweetening materials may be recovered in the form of liquid sweetener materials or in the form of a water soluble dry sweetener material. These materials are chemically stable under usual ambient temperature conditions and can be further stabilized against deterioration by fungicidal action.

It is therefore an object of the present invention to provide a process of recovering the protein of the complex referred to above as a sweetener material which is many times sweetener than sucrose from Nigerian berries, the process being usable on a commercial scale and in a manner providing purified stable products.

BRIEF DESCRIPTION OF THE DRAWING

The figure of the drawing is a flow sheet diagrammatically illustrating a preferred embodiment of the process of the invention.

DESCRIPTION OF PREFERRED EMBODIMENT

As indicated at 10 in the drawing, the Nigerian berries are first removed and separated from the stems of the bunches in order to facilitate further processing of the berries. This can be done manually, for example, as the bunches are carried on a conveyor belt past workers who remove the berries from the stems, or the berries can be mechanically stripped from the stems, for example, by upper, and lower comb-like members having relatively widely spaced wire teeth, with the teeth of the two members directed toward each other. The berries are then washed with water to remove extraneous impurities and the water discarded.

The seeds of the Nigerian berries have a thin shell covered with very short spines surrounding a kernel having an appearance and consistency similar to that of a very small garden pea. These seeds not only interfere with treatment of the berries to separate the aqueous sweetening materials from the solids of the berries, but the kernels contain an extremely bitter material which is liberated if the shell of the seed is cut or broken. This bitter material is difficult to remove from the recovered sweetening material and it is important to remove and discard the seeds at an early stage in the process. A seed removal step is indicated at 12 and a preferred operation is to employ a machine analogous to a cherry pitting machine in which the seed is pushed or punched out of the fruit leaving the pulp and skin. It is almost impossible to remove all of the seeds from the berries as almost inevitably a few of the berries will be missed, and care must be taken not to cut or break the seeds in further steps of the process.

After as many of the seeds as practical have been removed from the berries, the remaining material including any berries from which the seeds have not been removed are further treated as indicated at 14 to break down the cells of the pulp to thereby liberate the water soluble carbohydrate-protein complex referred to above so that it can be removed in water solution. An amount of water approximately equal to twice the weight of the original berries being processed is preferably added as indicated at 16 and the mixture subjected to a homogenizing operation preferably in a vessel such as a stainless steel tank, in which an agitator of the impeller type is rotated at high speed. The blades of such impeller are preferably made of resilient plastic or rubber to assist in preventing any breaking or cutting of the shells of residual seeds in the mixture. The impeller is therefor run at a speed just below that at which the seeds are damaged to the extent which liberates the bitter material referred to above. This homogenization can be continued for a sufficient length of time to produce a semi liquid material in which substantially all of the natural cells of the pulp of the fruit have been ruptured and the homogenized material is primarily a suspension of finely divided solids in an aqueous solution of water soluble material including the carbohydrate-protein complex.

An alternate procedure is to stop the homogenizing operation as soon as the residual seeds have been liberated from the berries and the pulp and skins become a fluid mass. The seeds can then be screened from this fluid mass after which the separated material can be subjected to more intense homogenization in the same or similar apparatus to more thoroughly break down the cells of the pulp.

The amount of water added for the homogenizing operation should be enough to provide a readily flowable and separable mixture of the homogenized material from which a low viscosity aqueous solution of the carbohydrate-protein complex can be separated. Too little water results in inadequate separation and too much water results in unnecessary dilution of the aqueous solution. Thus amounts of added water between approximately 1½ times the weight of the original berries up to 3 or 4 times this weight can be employed.

As indicated at 16, the aqueous material or partly diluted juice is separated from the solids including any residual seeds which may be present preferably by a filtering operation followed by a high speed centrifugal clarification operation. Thus the semiliquid material from the homogenizer can be filtered, for example, in a conventional filter press or similar apparatus employing cloth filter bags. In general, such an operation will not remove all of the very finely divided suspended solids from the separated aqueous liquid. These solids can, however, be removed in high speed centrifugal separators now available commercially to clarify the aqueous liquid. A filtering operation only can be employed by adding a suitable filter aid in the form of a finely divided inert material or the entire separation can be carried out in a high speed centrifugal separator.

In any case the solid residue from either a filtering operation or a centrifugal separation is washed with water as also indicated at 16 and this wash water is separated from the solid residue and added to the separated juice to provide a diluted juice. Preferably the washing is repeated several times with decreasing amounts of water. The total amount of water indicated at 17 employed for washing will, in general, be approximately equal to the original weight of the berries being processed so that the total weight of water added to the diluted juice will be approximately three times that of the original berries being processed. The separated solids are discharged from the process as indicated at 18.

The diluted juice may then be optionally subjected to a dialyzing operation as indicated at 20. The preferred dialyzing membrane is regenerated cellulose, preferably that produced by the cuprammonium process. This dialyzation can be accomplished by known procedures, for example, by introducing the solution to be dialyzed into cellophane bags and suspending such bags in water or flowing the liquid material through tubular regenerated cellulose member positioned in water. The water should be as free as is practicable from ions and small molecules which will diffuse back into the liquid being dialyzed. Water soluble impurities, most of which have molecular weight below 500, will diffuse through the diaphragm into the water and can be discarded from the process as indicated at 12. Best results are obtained if the temperature of the liquids in contact with the diffusion membranes is maintained between approximately 4° and 10° Centigrade. The time required to remove most of the dialyzable impurities and produce a purified sweet liquor will usually range from approximately 3 to 5 hours.

With the amount of water discussed above as being added in the prior homogenizing and washing operations, the liquid from the separation and washing operations or the purified sweet liquor from the dialyzing operation will have a viscosity similar to that of a light corn syrup commercially sold for table use. This viscosity may, however, be adjusted by adding water if the viscosity is greater than that desired or by evaporating water under vacuum conditions at a temperature below about 65° and preferably below 55° C., if the viscosity is less than that desired. The liquid material thus produced is an aqueous solution of the carbohydrate-protein complex discussed above. A sweet liquor having the viscosity above discussed contained 42 milligrams of the complex per 100 grams of water, which is a concentration on a weight basis of approximately 0.042%. Nevertheless, 1 gram of such sweet liquor has the sweetening effect of approximately 6 grams of dry cane or beet sugar. This sweet liquor is chemically stable at ambient temperature below about 65° C. and, if stored for extended times, can be stabilized against fungicidal action by the addition of a stabilizer as indicated at 24 to produce a stabilized product No. 1 indicated at 26. The stabilizer may be about 10% of benzoic acid or about 1.4% of methyl-p-hydroxybenzoate by weight based on the weight of the complex in the solution or may be a mixture of these stabilizing agents.

The protein portion of the carbohydrate-protein complex referred to above may be separated from the carbohydrate. A preferred manner of liberating the carbohydrate from the protein is to irradiate a shallow body or layer of an aqueous solution of the complex with ultraviolet light. The irradiated solution may be the sweet liquor discussed above. The irradiation is preferably carried out when the solution has viscosity of between approximately 1.5 and 11 centipoises, the optimum viscosity being around 5.6 centipoises. Thus the sweet liquor can be adjusted in viscosity as indicated at 34 in the manner discussed above, preferably to 5.6 centipoises. As indicated at 36, it can then be irradiated with ultraviolet light, for example, that from a quartz mercury vapor lamp. Such a lamp has a wide range of wavelengths in the ultraviolet and has its most intense radiation in this range at a wavelength of approximately 2532 angstrom units. This irradiation is preferably carried out while the liquid is at a temperature between approximately 2 and 8° C.

The intensities and principal wavelengths of the ultraviolet radiation from different types of ultraviolet sources vary over a substantial range and the intensity of the radiation even for the same type of source varies from unit to unit. The best test of the optimum time for irradiation treatment is therefor the extent of denaturing of the carbohydrate-protein complex or breaking of the chemical bond between the carbohydrate and protein is the amount of recovery of the carbohydrate after precipitation of the protein in the irradiated solution and removal of the precipitated material, as described below. Recoveries of 80 to 90% can be obtained using a quartz mercury vapor lamp and radiation time from 10 minutes to one hour or more, depending upon the intensity of the radiation.

Although the employment of ultraviolet irradiation for breaking down the carbohydrate-protein complex referred to is the most efficient, other treatments for this purpose are possible, such as subjecting the solution of the complex to ultrasonic vibration, X-ray radiation, radiation from radio active isotopes, hydrolysis with dilute acids or enzyme treatment.

The liberated protein can be precipitated as indicated at 38 by any one of a number of protein precipitating agents indicated as being added at 39, a preferred agent being polyvinyl-alcohol of sufficiently low molecular weight to be a thin liquid, for example, in an amount equal to approximately 20% by volume of the resulting solution containing the protein and liberated carbohydrate. Various other protein precipitation agents can be employed, for example, trichloroacetic acid, a chloroform-amyl alcohol mixture or an aqueous solution made by adding 1.25 volumes of ethanol saturated with potassium acetate to one volume of water and adding dilute potassium hydroxide to provide a pH of 8 to 9. These precipitation agents also precipitate any of the residual carbohydrate-protein complex which has not been broken down.

The precipitated material is preferably centrifugally separated from the resulting carbohydrate solution, since it can be substantially completely removed as indicated at 40 by continuous centrifugal separation in a commercial type of high speed continuous centrifugal separator. Thus the precipitated solids have sufficient flow characteristic to be continuously discharged from the bowl of the separator as indicated at 42, the discharge of the carbohydrate solution being indicated at 43.

The amount of precipitating agent added to the aqueous material containing the liberated protein will vary with the particular agent employed and with the amount of protein present in the material. No more than the amount necessary to precipitate substantially all of the protein should be employed in order to avoid as far as possible the addition of extraneous materials to the material being treated. The minimum amount of protein precipitating agent which will precipitate substantially all of the protein can be determined in each operation or for individual batches of such aqueous material by making preliminary tests on a small amount of this material or by adding the precipitating agent in increments to a batch of such aqueous material and making tests on small portions of such batch after each increment to see if additional precipitating agent is required. The separated solids are preferably washed with small amounts of water and the washing water added to the liquid material separated from the solids. The resulting liquid material is a purified carbohydrate solution which can be recovered as a sweetening material as disclosed in my copending application referred to above.

The precipitated and separated protein is then further purified. This purification includes mixing the protein with water as indicated at 44 and 45, sufficient water being added to dissolve the protein and produce a resultant aqueous solution containing between 60 and 80% water by weight and preferably about 70%. The protein is then reprecipitated preferably employing a different precipitating agent, and again separated from the aqueous material containing impurities. Any of the precipitating agents listed in the copending application can be employed but a preferred precipitating agent is dry ammonium sulfate, i.e. $(NH_4)_2SO_4$.

An amount of dry ammonium sulfate sufficient to saturate the aqueous solution from the mixing step 44 is added to the aqueous solution as indicated at 46 and 47 in order to precipitate most of the protein leaving in solution any water soluble impurities not precipitated by the ammonium sulfate. At saturation the solution is approximately 40% ammonium sulfate by weight and such mixture is allowed to stand for approximately 45 to 60 minutes. The resulting mixture is then centrifugally separated, as indicated at 48, employing a high speed centrifugal separator.

A further amount of protein can usually be precipitated from the separated liquid. An additional amount of additional dry ammonium sulfate is therefor added to such liquid as indicated at 50 and 52 and the resulting mixture after again standing for 45 to 60 minutes is subjected to high speed centrifugal separation as indicated at 54. Two such precipitating and centrifugal separation steps are indicated but more may be employed, if necessary to recover substantially all of the protein. The separated liquid containing water soluble impurities is discharged from the process as indicated at 56.

The protein separated in the centrifugal separation steps 48 and 54 is again admixed with sufficient water as indicated at 58 and 60 to produce a protein solution having a viscosity between approximately 1.4 and 1.5 and preferably between 1.47 and 1.48 centipoises. The resulting solution is then subjected to chromatographic purification as indicated at 62. This purification involves flowing the solution through a bed of granular material which may be any one of known cellulose chromatographic agents. Examples of such agents are diethylaminoethylethercellulose, known commercially as Deae-Cellulose, and carboxymethylcellulose, known commercially as CM Celluose. Other similar agents are also sold under the tradename Saphedex G50 and Saphedex G200.

Impurities are adsorbed on the cellulosic chromatographic agents in bands and a purified aqueous protein solution is recovered as a sweetener liquid as indicated at 64. The chromatographic bands move downwardly through the bed and when a band approaches the bottom of the bed, wash water is substituted for protein solution. The initial portion of the wash water is recovered as part of the sweetener liquid since it contains purified protein. The bands are then washed through the bed and the wash water containing impurities discarded as indicated at 66, after which such bed can be employed for purification of further sweetener liquid.

If desired all or a portion of the sweetener liquid can be dried as indicated at 68. Such drying can be vacuum drying at a temperature not greater than 55° C. or can be freeze drying. A solid sweetening agent in the form of dryprotein recovered as indicated at 70. This dry protein is a crystalline powder or, if caked as sometimes occurs, can be ground to a dry crystalline powder. It has intense sweetness as compared to sucrose.

The resulting protein sweetening agent is sufficiently pure for almost any use, even if the dialyzing step indicated at 20 is omitted. If an extremely pure product is desired, the dialyzing step can be employed to treat the diluted juice prior to the liberating of the protein from the carbohydrate as disclosed above, or the dialyzing step may be employed to treat any of the protein solutions discussed above which are produced after separation from the carbohydrate including the purified solution from the chromatographic separation step indicated at 62. However, the protein precipitation steps and the chromatographic purification eliminate from the protein practically all of the impurities which would be removed by the dialyzation step.

While it is preferable to employ a series of protein precipitating steps with different types of precipitating agents, it is possible to employ one set of protein precipitating and separation steps only. For example, the precipitation and separation steps 46, 48, 50 and 54 can be employed to precipitate and separate the protein in the aqueous material from the irradiation step 36 by delivering such aqueous material directly to the steps 46, 48, 50, 54 and 58, thus omitting the steps 38, and 40. A purified liquid sweetener containing the protein in aqueous solution, which is satisfactory for most purposes, is thereby produced in the following chromatographic purification step 64 which can be dried to a purified solid sweetener in the step 68.

I claim:

1. The method of recovering a water soluble sweetening material from *Dioscoreophyllum cumminsii* berries, which comprises:
   separating substantially all of the seeds from the skin and pulp of said berries;
   thereafter subjecting said skin and pulp to high speed homogenization in the presence of added water to break down the cells of said pulp to produce a separable mixture of an aqueous liquid having water soluble material including said sweetening material as part of a carbohydrate-protein complex in solution and finely divided water insoluble material in suspension;
   separating said aqueous liquid from said suspended solid material including high speed centrifugal separation for removing substantially all of said suspended solid material from said aqueous liquid to produce an aqueous solution of said water soluble material substantially free of suspended solids;
   irradiating said aqueous solution with ultraviolet radiation to break the chemical bond between the carbohydrate and protein of said water soluble carbohydrate-protein complex;
   and thereafter precipitating said protein and separating said protein from the remaining aqueous material to produce a water soluble protein material;
   redissolving the separated water soluble protein in water and flowing the resulting solution through a granular bed of cellulose chromatographic agent which adsorbs impurities from said resultant protein solution and recovering a purified protein liquid sweetener.

2. The method of claim 1 in which precipitating of said protein is produced by adding dry ammonium sulfate to an aqueous material containing said protein in solution, said ammonium sulfate being added in sufficient amount to saturate said aqueous material.

3. The method of claim 2 in which the protein is first precipitated from a first aqueous material resulting from said irradiating of said aqueous solution and separated from said first aqueous material;
   and said separated protein is then redissolved in water to provide a second aqueous material containing between 60 and 70% water;
   and said ammonium sulfate is added to said second aqueous material.

4. The method of claim 3 in which said separations of said protein from said first and second aqueous materials are centrifugal separations which remove substantially all of said aqueous materials from said protein.

5. The method of claim 1 in which said chromatographic agent is diethylaminoethylethercellulose.

6. The method of claim 1 in which said chromatographic agent is carboxymethylcellulose.

7. The method of claim 1 in which the purified protein liquid sweetener is dried under vacuum conditions at a temperature not greater than 55° C. to recover a purified protein solid sweetener.

8. The process of recovering a water soluble sweetening material from *Dioscoreophyllum cumminsii* berries, which comprises:
   separating substantially all of the seeds from the skin and pulp of said berries;
   thereafter subjecting said skin and pulp to high speed homogenization in the presence of added water to break down the cells of said pulp to produce a separable mixture of an aqueous liquid having water soluble material including said sweetening material as part of a carbohydrate-protein complex in solution and finely divided water insoluble material in suspension;
   separating said aqueous liquid from said suspended solid material by removing substantially all of said suspended solid material from said aqueous liquid to produce an aqueous solution of said water soluble material substantially free of suspended solids;
   irradiating said aqueous solution with ultraviolet radiation to break the chemical bond between the carbohydrate and protein of said water soluble carbohydrate-protein complex;
   and thereafter precipitating said protein and separating said protein from the remaining aqueous material to produce a water soluble protein material;
   redissolving the separated water soluble protein in water and flowing the resulting solution through a granular bed of cellulose chromatographic agent which adsorbs impurities from said resultant protein solution and recovering a purified protein liquid sweetener.

9. The method of claim 8 in which precipitating of said protein is produced by adding dry ammonium sulfate to an aqueous material containing said protein in solution, said ammonium sulfate being added in sufficient amount to saturate said aqueous material.

10. The method of claim 8 in which said chromatographic agent is diethylaminoethylether cellulose.

11. The method of claim 8 in which said chromatographic agent is carboxymethylcellulose.

References Cited

UNITED STATES PATENTS

| | | | |
|---|---|---|---|
| 3,687,693 | 8/1972 | Essiet | 99—141 |
| 3,682,880 | 8/1972 | Brouwer et al. | 260—112 R |

OTHER REFERENCES

The Proteins, Neurath, Vol. III, pp. 11, 13–14, 21–23, 1965.

Journal of Food Science, Vol. 34, October 1969, pp. 408–411, Ingleff et al.

FEBS Letters, Vol. 21, number 1, March 1972.

HOWARD E. SCHAIN, Primary Examiner

U.S. Cl. X.R.

426—212, 217